(12) United States Patent
Kongkanand et al.

(10) Patent No.: US 9,979,028 B2
(45) Date of Patent: May 22, 2018

(54) CONFORMAL THIN FILM OF PRECIOUS METAL ON A SUPPORT

(71) Applicant: GM GLOBAL TECHNOLOGY OPERATIONS LLC, Detroit, MI (US)

(72) Inventors: Anusorn Kongkanand, Rochester Hills, MI (US); Ratandeep S. Kukreja, Warren, MI (US); Joel W. Clancey, Boulder, CO (US); Andrew Cavanaugh, Boulder, CO (US); Steven M. George, Boulder, CO (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 128 days.

(21) Appl. No.: 14/527,121

(22) Filed: Oct. 29, 2014

(65) Prior Publication Data

US 2015/0171433 A1    Jun. 18, 2015

Related U.S. Application Data

(60) Provisional application No. 61/915,731, filed on Dec. 13, 2013.

(51) Int. Cl.
 *H01M 4/86* (2006.01)
 *H01M 4/90* (2006.01)
 *H01M 4/92* (2006.01)

(52) U.S. Cl.
 CPC ......... *H01M 4/926* (2013.01); *H01M 4/8657* (2013.01); *H01M 4/9041* (2013.01);
 (Continued)

(58) Field of Classification Search
 CPC .... H01M 4/926; H01M 4/8657; H01M 4/925; H01M 4/9075; H01M 4/9083;
 (Continued)

(56) References Cited

U.S. PATENT DOCUMENTS 6,099,965 A * 8/2000 Tennent ............... B01J 20/20
                                                    264/29.1
6,498,097 B1   12/2002 Park et al.
(Continued)

FOREIGN PATENT DOCUMENTS

JP    2004-122031    4/2004
JP    2004-207092    7/2004
(Continued)

OTHER PUBLICATIONS

Arico, "Review Article: Nanostructured materials for advanced energy conversion and storage devices", Nature materials, vol. 4, May 2005, pp. 366-377.*

(Continued)

*Primary Examiner* — Monique Jackson
(74) *Attorney, Agent, or Firm* — Reising Ethington P.C.

(57) ABSTRACT

A coated substrate for forming fuel cell catalyst layers includes a plurality of substrate particles, an adhesion layer disposed over the substrate particles, and a precious metal layer disposed over the adhesion layer. The substrate particles may be carbon powders, carbon nanorods, carbon nanotubes and combinations thereof; with a preferred aspect ratio from 10:1 to 25:1. The adhesion layer includes a tungsten metal layer and may be formed into a heterogeneous layer comprising a lattice-interrupting layer interposed between two tungsten metal layers. The lattice-interrupting layer reduces mechanical stress to the adhesion layer with extended thickness that may develop when it experiences changing environments, and can be any layer other than the metal layer, for example, $Al_2O_3$, Al, or $WO_x$, where x is 1.5 to 3.0. Characteristically, the coated substrate is used in fuel cell applications such as providing the catalyst particles used in the cathode and/or anode catalyst layers.

18 Claims, 2 Drawing Sheets

(52) U.S. Cl.
CPC ....... *H01M 4/9075* (2013.01); *H01M 4/9083* (2013.01); *H01M 4/925* (2013.01)

(58) Field of Classification Search
CPC . B01J 21/185; B01J 23/30; B01J 23/52; B01J 23/38; B01J 23/40; B01J 23/42; B01J 23/44; B01J 23/468; B01J 23/6527; B01J 23/687
USPC .......................................................... 428/404
See application file for complete search history.

(56) References Cited

U.S. PATENT DOCUMENTS

| | | | |
|---|---|---|---|
| 7,871,740 | B2 | 1/2011 | Tamura et al. |
| 8,187,769 | B2 | 5/2012 | Choi et al. |
| 8,236,724 | B2 | 8/2012 | Yoshitake et al. |
| 8,647,723 | B2 | 2/2014 | Kongkanand et al. |
| 9,005,816 | B2 * | 4/2015 | Amine ................ H01M 12/08 429/231.7 |
| 2002/0122972 | A1 | 9/2002 | Klitsner et al. |
| 2003/0017715 | A1 | 1/2003 | Muller et al. |
| 2003/0119920 | A1 * | 6/2003 | Wang ................ B01D 69/141 518/715 |
| 2003/0194598 | A1 | 10/2003 | Chan |
| 2004/0211357 | A1 | 10/2004 | Gadgil et al. |
| 2005/0064098 | A1 | 3/2005 | Elgers et al. |
| 2005/0282061 | A1 | 12/2005 | Campbell |
| 2006/0093848 | A1 | 5/2006 | Senkevich et al. |
| 2009/0054228 | A1 | 2/2009 | Ichikawa et al. |
| 2011/0151354 | A1 | 6/2011 | Jin et al. |
| 2011/0165496 | A1 * | 7/2011 | Shirvanian .......... H01M 4/8642 429/483 |
| 2012/0100301 | A1 * | 4/2012 | Kongkanand ........... C23C 16/06 427/534 |

FOREIGN PATENT DOCUMENTS

| | | |
|---|---|---|
| JP | 2005-228755 | 8/2005 |
| JP | 2006-127980 | 5/2006 |
| JP | 2006-172864 | 6/2006 |
| JP | 2006-172864 A | 6/2006 |
| JP | 2006-179292 | 7/2006 |
| JP | 2006-281155 | 10/2006 |
| JP | 2008-059841 | 3/2008 |
| JP | 2008-183508 | 8/2008 |
| JP | 2009-045583 | 3/2009 |
| JP | 2009259492 | 11/2009 |
| JP | 2013-206543 | 7/2013 |
| JP | 2014-504424 | 2/2014 |
| WO | WO 2013144631 A1 * | 10/2013 .......... H01M 8/1004 |

OTHER PUBLICATIONS

Baker, Growth of continuous and ultrathin platinum films on tungsten adhesion layers using atomic layer deposition techniques, Applied Physics Letters 101, Sep. 2012.*

Debe, Novel catalysts, catalysts support and catalysts coated membrane methods, Vielstich (eds), Handbook of Fuel Cells—Fundamentals, Technology and Applications, vol. 3, Wiley NY, Dec. 2010.*

Herrmann, Multilayer and functional coatings on carbon nanotubes using atomic layer deposition, Applied Physics Letters 87, Sep. 2005.*

Krulik, Metallic Coatings, Survey; Kirk-Othmer Encyclopedia of Chemical Technology, Dec. 2000.*

Marichy, Review: Carbon-nanostructures coated/decorated by atomic layer deposition: Growth and applications; Coordination Chemistry Reviews, vol. 257, Issues 23-24, Dec. 2013, available online Aug. 18, 2013, pp. 3232-3253.*

Goldstein et al., "Surface poisoning in the nucleation and growth of palladium atomic layer depositio with Pd(hfac) 2 and formalin," Thin Solid Films, (2011), pp. 1-9.

* cited by examiner

CONFORMAL THIN FILM OF PRECIOUS METAL ON A SUPPORT

CROSS-REFERENCE TO RELATED APPLICATIONS

This application claims the benefit of U.S. provisional application Ser. No. 61/915,731 filed Dec. 13, 2013, the disclosure of which is hereby incorporated in its entirety by reference herein.

TECHNICAL FIELD

In at least one aspect, the present invention is related to catalyst layers used in fuel cell applications.

BACKGROUND

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode.

In proton exchange membrane type fuel cells, hydrogen is supplied to the anode as fuel, and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel and oxidant to disperse over the surface of the membrane facing the fuel- and oxidant-supply electrodes, respectively. Each electrode has finely divided catalyst particles (for example, platinum particles) supported on carbon particles to promote oxidation of hydrogen at the anode and reduction of oxygen at the cathode. Protons flow from the anode through the ionically conductive polymer membrane to the cathode where they combine with oxygen to form water which is discharged from the cell. The MEA is sandwiched between a pair of porous gas diffusion layers ("GDL") which, in turn, are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cells arranged in stacks in order to provide high levels of electrical power. Although the catalyst layers used in fuel cells work reasonably well, there is a need for improved fuel cell catalyst layers.

Carbon black and carbon nanotubes are preferred support for fuel cell electrocatalysts due to their excellent electronic conductivity, good mechanical and chemical stabilities, and low cost. Catalyst layers typically use platinum and/or a platinum alloy which are made into very fine nanoparticles in order to improve overall activity by enhancing the surface area. However, the inert surface of the carbon makes it very difficult for metal to attach. Nucleation of platinum on carbon surface has proven to be challenging resulting in large platinum particle size and particle migration and agglomeration. Moreover, the high surface energy of platinum makes it very difficult to coat a thin and smooth surface. Scanning electron micrographs illustrate the tendency of these prior art coatings to agglomerate without forming a smooth homogeneous layer. The poor interaction between platinum and carbon surfaces makes it difficult to nucleate and form a uniform film. In particular, due to poor nucleation and layer growth, a relatively high minimum-layer thickness is required in order to ensure electric conduction.

A commercially available nanostructured thin film (NSTF) catalyst is made by sputtering Pt on a self-assembled perylene red dye support. The support is electronically non-conductive, so electron must transport through the coated continuous layer of Pt. On the other hand, this catalyst type is more durable than conventional carbon-supported Pt nanoparticles due to the smooth Pt surface and superior stability of the support. Some of the prior art sputtered films are observed to be non-uniform due to the line of sight nature of the sputtering process.

Accordingly, there is a need for improved materials for forming fuel cell catalyst materials.

SUMMARY

The present invention solves one or more problems of the prior art by providing in at least one embodiment a coated substrate for forming fuel cell catalyst layers. The coated substrate includes a plurality of substrate particles. An adhesion layer disposed over each substrate particle and a precious metal layer disposed over the adhesion layer. The adhesion layer includes a tungsten metal layer, a tungsten-alloy layer, $WO_x$ layer, $W_xN$ layer, or $W_xC$ layer. Characteristically, the coated substrate is used in fuel cell applications such as providing the catalyst particles used in the cathode and/or anode catalyst layers. Advantageously, the present embodiment provides catalysts with higher activity and durability over conventional dispersed supported catalysts. Moreover, since the method is a dry method, catalyst processing cost is reduced and chemical/precious metal waste minimized.

In another refinement, a coated substrate for forming fuel cell catalyst layers is provided. The coated substrate includes a plurality of substrate particles. The substrate particles have an average spatial dimension from about 20 nm to 1 micron and a length-to-width aspect ratio greater than 10. The coated substrate also includes an adhesion layer disposed over each substrate particle and a precious metal layer disposed over the adhesion layer. The adhesion layer includes a component selected from the group consisting of tungsten metal, a tungsten-alloy, tungsten oxide, tungsten nitride, and tungsten carbide.

In another embodiment, a method for forming the coated substrate is provided. The method includes a step of depositing an adhesion layer onto each particle of a plurality of substrate particles. A precious metal layer is then deposited onto the adhesion layer to form a precious metal-coated substrate. The precious metal-coated substrates are then incorporated into a fuel cell catalyst layer.

BRIEF DESCRIPTION OF THE DRAWINGS

Exemplary embodiments of the present invention will become more fully understood from the detailed description and the accompanying drawings, wherein.

DETAILED DESCRIPTION

Figure 1:
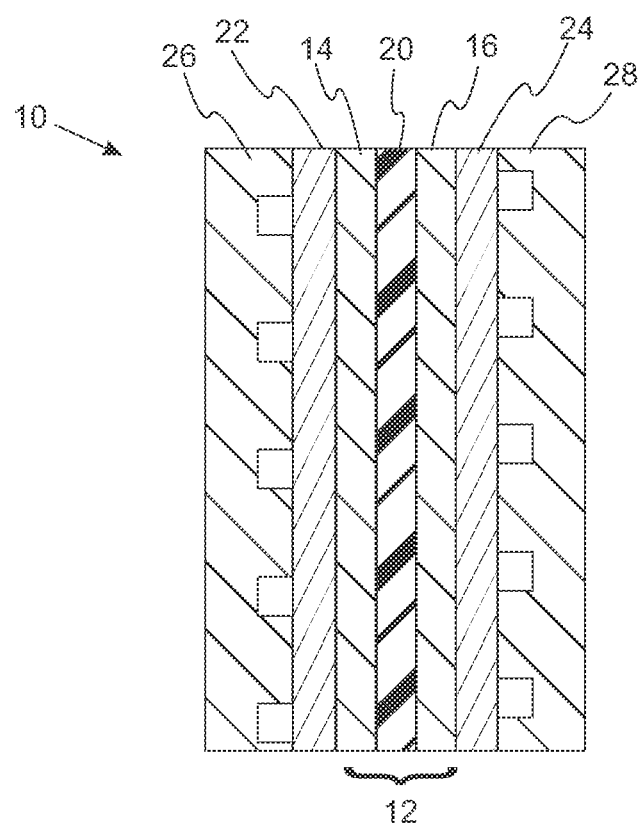
FIG. 1 is a cross section of a fuel cell including a plurality of precious metal-coated substrates particles.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

In an embodiment, the prefix "nano" means that the described particles have at least one spatial dimension from about 1 nanometer to about 100 nanometers. In a variation, the prefix "nano" means that the described particles have at least one spatial dimension from about 10 nanometers to about 80 nanometers. In another variation, the prefix "nano" means that the described particles have at least one spatial dimension from about 20 nanometers to about 50 nanometers.

With reference to FIG. 1, a fuel cell including a plurality of precious metal-coated substrate particles is provided. Fuel cell 10 includes the membrane electrode assembly 12 which includes anode catalyst layer 14, cathode catalyst layer 16, and ion conducting membrane (i.e., proton exchange membrane) 20. One or both of anode catalyst layer 14, cathode catalyst layer 16 include a plurality of precious metal-coated substrate particles which are prepared as set forth below. Proton (i.e., ion) conducting membrane 20 is interposed between anode catalyst layer 14 and cathode catalyst layer 16 with anode catalyst layer 14 disposed over the first side of proton conducting membrane 20 and cathode catalyst layer 16 disposed over the first side of proton conducting membrane 20. Fuel cell 10 also includes porous gas diffusion layers 22 and 24. Gas diffusion layer 22 is disposed over anode catalyst layer 14 while gas diffusion layer 24 is disposed over cathode catalyst layer 16. In yet another variation, fuel cell 10 includes anode flow field plate 26 disposed over gas diffusion layer 22 and cathode flow field plate 28 disposed over gas diffusion layer 24. During operation, hydrogen is supplied to the anode catalyst layer 14 as fuel and oxygen is supplied to the cathode catalyst layer 16 as the oxidant, thereby producing electricity as the result of the electrochemical process therein.

Figure 2A:
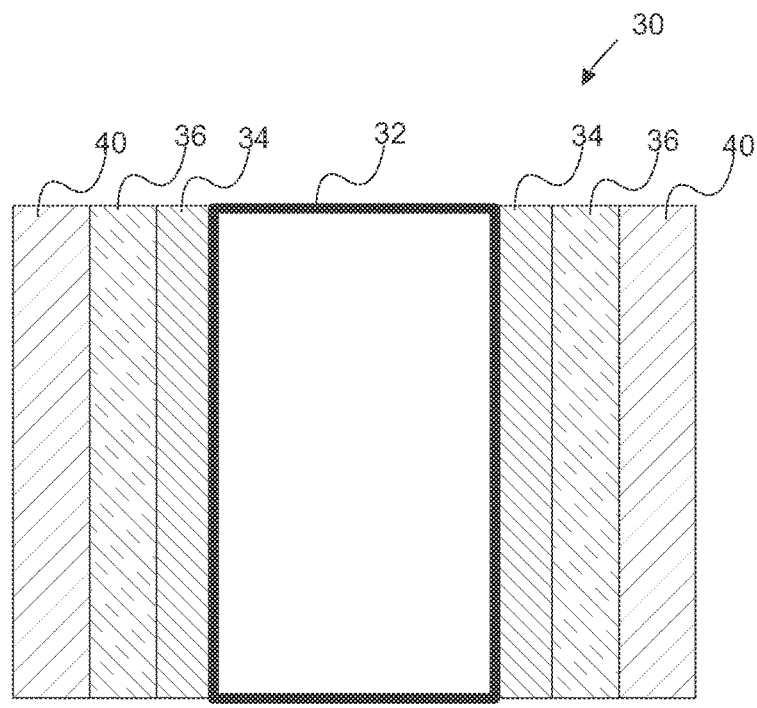
FIG. 2A is a schematic cross-section of a portion of coated substrate particle.
Figure 2B:
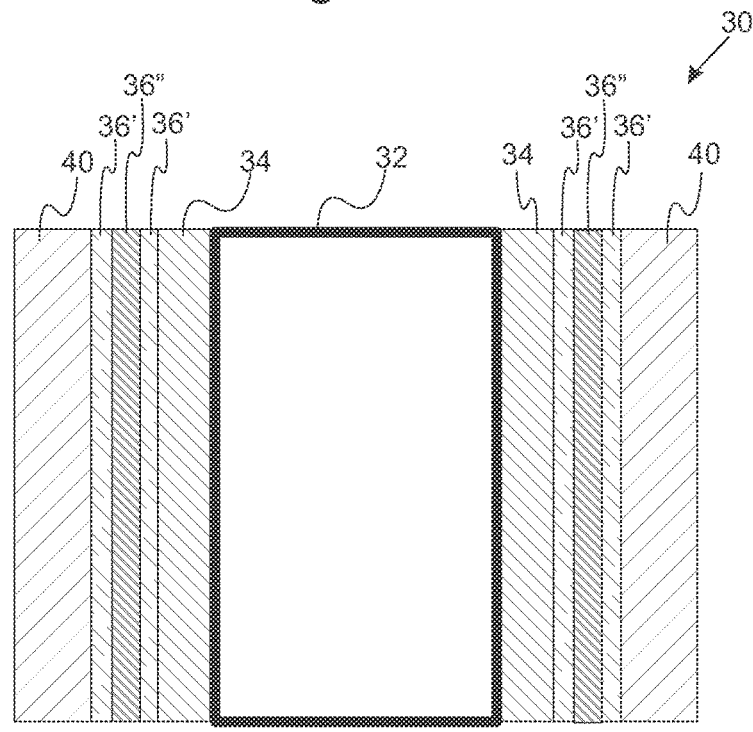
FIG. 2B is a schematic cross-section of a portion of a coated substrate particle.

With reference to FIGS. 2A and 2B, schematics of a portion of a coated substrate particle used as set forth in FIG. 1 are provided. FIG. 2A provides a schematic of a portion of a coated substrate particle using a single adhesion layer. Coated substrate particle 30 includes substrate particle 32 and, optionally over-coated with intermediate layer 34. Intermediate layer 34 is disposed over substrate particle 32 in order to protect the substrate during coating. In a variation, intermediate layer 34 is an oxide layer or other low-cost stable layer. Examples of useful layers include, but are not limited to, aluminum oxides (e.g. $Al_2O_3$), silicon oxides (e.g., $SiO_2$), titanium oxides (e.g., $TiO_2$), zirconium oxides (e.g., $ZrO_2$), $WO_x$, TiC, $Ti_yN$, $TiO_{2-z}N_z$, and the like where x is from 2.5 to 3, y is from 0.7 to 1.1, and z is 0 to 0.5.

Adhesion layer 36 is disposed over substrate particle 32, or if intermediate layer 34 is present, over intermediate layer 34. Adhesion layer 36 includes a component selected from the group consisting of a tungsten-alloy layer, tungsten oxide layers (e.g., $WO_x$ where x is 1.5 to 3.0), tungsten nitride layers (e.g., $W_oN$ where o is 0.5 to 2), and/or tungsten carbide layers (e.g., $W_pC$ where p is 1 to 2). In another refinement, adhesion layer 36 may be formed into a heterogeneous layer, for example, 36'/36"/36' where 36' is a W metal layer and 36" is "lattice-interrupting layer". The lattice-interrupting layer 36" reduces mechanical stress to the adhesion layer 36 with extended thickness that may develop when it experiences changing environments. The lattice-interrupting layer 36" can be any layer other than the metal layer 36', for example, $Al_2O_3$, Al, $WO_x$ where x is 1.5 to 3.0, etc. In a refinement, adhesion layer 36 has a thickness from about 0.5 to about 10 nanometers. In another refinement, adhesion layer 36 has a thickness from about 0.5 to about 5 nanometers. In still another refinement, adhesion layer 36 has a thickness from about 1 to about 4 nanometers. In a refinement, intermediate layer 34 contacts adhesion layer 36. In a variation, the intermediate layer 34 is a metal oxide layer. For example, intermediate layer 34 includes a component selected from the group consisting of aluminum oxide, silicon oxide, titanium oxide, zirconium oxide, tungsten oxide, titanium carbide, titanium nitride, titanium oxynitride, and combinations thereof.

Typically, intermediate layer 34 has a thickness from about 0.5 to 10 nanometers. Precious metal layer 40 is disposed over adhesion layer 36. Precious metal layer 40 includes a precious metal selected from the group consisting of platinum, gold, palladium, iridium, and alloys thereof, and combinations thereof. In a refinement, precious metal layer 40 has a thickness from about 0.5 to about 10 nanometers. In another refinement, precious metal layer 40 has a thickness from about 0.5 to about 5 nanometers. In still another refinement, precious metal layer 40 has a thickness from about 0.5 to about 3 nanometers. It should be appreciated that each of the layers set forth above can be deposited by a number of techniques known to those skilled in the art. Such deposition techniques include, but are not limited to, sputtering, chemical vapor deposition, atomic layer deposition, evaporation, chemical deposition, and the like.

Typically, the coated substrate includes a plurality of substrate particles. Substrate particle 30 may have any number of shapes without limiting the invention in any way. Examples of such shapes include, but are not limited to, nano-rods, nanotubes, nano-rafts, non-electrically conducting particles, spherical particles, and the like. Nano-rods, nano-rafts, and nanotubes are each characterized by having at least one spatial dimension from about 10 nanometers to about 100 nanometers. In a refinement, substrate particle 30 includes particles having a length-to-width aspect ratio from 10:1 to 25:1. In another refinement, substrate particle 30 includes particles having a length-to-width aspect ratio from 13:1 to 20:1. In still another refinement, substrate particle 30 includes particles having a length-to-width aspect ratio of about 15:1. In a preferred refinement, substrate particle 30 includes a plurality of substrate particles selected from the group consisting of carbon powders, carbon nanorods, carbon nanotubes, and combinations thereof.

In another embodiment, an ink composition for forming catalyst layers is provided. Typically, the ink composition is coated onto the ion conducting membrane or gas diffusion layers and allowed to dry thereby forming the anode and/or cathode catalyst layers set forth above. The ink composition includes a solvent system, an ion-conducting polymer dispersed within the solvent system, and a supported catalyst dispersed within the solvent system. The supported catalysts include a plurality of the coated substrate particles as set forth above. The amount of coated substrate particles is typically between 0.1 and 20 weight percent of the total weight of the ink composition. In another refinement, the amount of coated substrate particles is typically between 0.1 and 10 weight percent of the total weight of the ink composition. In still another refinement, the amount of coated substrate particles is typically between 0.5 and 5 weight percent of the total weight of the ink composition. Typical solvent systems include, but are not limited to, water, $C_{1-4}$ alcohols (methanol, ethanol, n-propanol, isopropanol, etc.). Typically, the solvent is present in an amount from about 30 to 99 weight percent of the total weight of the ink composition. In another refinement, the solvent system is present in an amount from about 40 to 98.9 weight percent of the total weight of the ink composition. In a refinement, the ion-conducting polymers typically include protogenic groups such as —$SO_2X$, —$PO_3H_2$, —COX, and combinations thereof where X is —OH, a halogen, or an ester. Examples of suitable ion-conducting polymers include, but are not limited to, perfluorosulfonic acid polymers (PFSA), hydrocarbon based ionomers, sulfonated polyether ether ketone polymers, perfluorocyclobutane polymers, and combinations thereof. In a variation, the ion conducting polymer is present in an amount of 1 to 20 weight percent of the total weight of the ink composition. It should be appreciated that at least a portion of the protogenic groups are neutralized via formation of the onium compound. Commercial NAFION® polymer is a particularly useful example of an ion-conducting polymer.

The following examples illustrate the various embodiments of the present invention. Those skilled in the art will recognize many variations that are within the spirit of the present invention and scope of the claims.

A 3M NSTF™ (nanostructured thin film) support is used as the substrate. The NSTF support is a highly-oriented laft-shape substrate made from a self-assembly of an organic compound (e.g., perylene red dye). Its high length-to-width aspect ratio of about 15 makes it very difficult to be coated with any metal. It is even more difficult with high-surface-energy metal such as platinum. Scanning electron micrographs indicates the problems associated with coating NSTF supports with platinum using a conventional sputtering method. Due to the line-of-sight property of the sputtering, most of the platinum was deposited on the top but little on the bottom. This is a wasteful use of platinum for a heterogeneous catalyst application.

To demonstrate the ability to coat a thin uniform film of platinum on a wide range of substrates using tungsten (W) as an adhesive layer, 14 cycles of tungsten are deposited on a NSTF sample, 1 cycle of $Al_2O_3$, then 14 cycles of W using atomic layer deposition (ALD). The $Al_2O_3$ layer is deposited to break the continuity of the W lattice and hence enhance the chemical and mechanical properties of the W adhesive layer. In this example, water and $Si_2H_6$ are used as reactants to deposit $Al_2O_3$ and W, respectively. This gives about 3 nm thick W/$Al_2O_3$/W adhesion layer. An intermediate layer 34 is not needed although it can be applied. Platinum is then deposited on the resulting layer using a hydrogen plasma (150 cycles of platinum ALD at 120° C., 100 watts, from MeCpPtMe$_3$ precursor). This gives a uniform platinum film of about 3 nm thick. In our previous work, continuous uniform film of 1.5 nm has been demonstrated on W adhesive layer. [Appl. Phys. Lett. 101, 111601 (2012)]. Scanning electron micrographs show that the coating of the platinum and W films is very uniform throughout the length of the NSTF in contrast to the conventional method. Similarly, an element-contrast Electron-Energy-Loss spectroscopy mapping of the prepared platinum/W-ALD/NSTF sample confirms good uniformity.

A uniform film of platinum can be coated on a carbon support by first allowing $NO_2$ to adsorb on the $sp^2$ carbon surface then the $Al_2O_3$ could be uniformly coated. Transmission electron micrographs confirm that $Al_2O_3$ is coated on carbon nanotubes. Subsequently the adhesion layer and platinum layer could be uniformly deposited on this layer in a similar manner as those described above. Although carbon nanotube was here demonstrated, any carbon substrate can be used.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A coated substrate comprises:
   a plurality of substrate particles selected from the group consisting of carbon powders, carbon nanorods, carbon nanotubes, and combinations thereof;
   an adhesion layer disposed over each substrate particle, the adhesion layer including a lattice interrupting layer interposed between two tungsten metal layers, the lattice interrupting layer being $Al_2O_3$, Al, or $WO_x$ where x is 1.5 to 3.0; and
   a precious metal layer disposed over the adhesion layer; and
   an intermediate layer interposed between the plurality of substrate particles and the adhesion layer wherein the intermediate layer includes a component selected from the group consisting of aluminum oxide, silicon oxide, titanium oxide, zirconium oxide, tungsten oxide, titanium carbide, titanium nitrides, titanium oxynitride, and combinations thereof.

2. The coated substrate of claim 1 wherein the substrate particles have an average spatial dimension from about 20 nm to 1 micron.

3. The coated substrate of claim 1 wherein the substrate particles have a length-to-width aspect ratio from 10:1 to 25:1.

4. The coated substrate of claim 1 wherein the substrate particles have a length-to-width aspect ratio from 13:1 to 20:1.

5. The coated substrate of claim 1 wherein the substrate particles have a length-to-width aspect ratio of about 15:1.

6. The coated substrate of claim 1 wherein the precious metal layer includes a precious metal selected from the group consisting of platinum, gold, palladium, iridium, and alloys thereof, and combinations thereof.

7. The coated substrate of claim 1 wherein the adhesion layer has a thickness from about 0.5 to about 5 nanometers.

8. The coated substrate of claim 1 wherein the precious metal layer has a thickness from about 0.5 to about 5 nanometers.

9. The coated substrate of claim 1 wherein the intermediate layer has a thickness from about 0.5 to 10 nanometers.

10. The coated substrate of claim 1 wherein the lattice interrupting layer is $Al_2O_3$ or Al.

11. The coated substrate of claim 1 wherein the lattice interrupting layer is $Al_2O_3$.

12. A coated substrate comprises:
    a plurality of substrate particles having an average spatial dimension from about 20 nm to 1 micron and an average length-to-width aspect ratio greater than 10, the plurality of substrate particles being selected from the group consisting of carbon powders, carbon nanorods, carbon nanotubes, and combinations thereof;
    an adhesion layer disposed over the substrate particle, the adhesion layer including a lattice interrupting layer interposed between two tungsten metal layers, the lattice interrupting layer being $Al_2O_3$, Al, or $WO_x$, where x is 1.5 to 3.0; and
    a precious metal layer disposed over the adhesion layer; and
    an intermediate layer interposed between the plurality of substrate particles and the adhesion layer wherein the intermediate layer includes a component selected from the group consisting of aluminum oxide, silicon oxide, titanium oxide, zirconium oxide, tungsten oxide, titanium carbide, titanium nitrides, titanium oxynitride, and combinations thereof.

13. The coated substrate of claim 12 wherein the average length-to-width aspect ratio is from greater than 10:1 to 25:1.

14. The coated substrate of claim 12 wherein the precious metal layer includes a precious metal selected from the group consisting of platinum, gold, palladium, iridium, and alloys thereof, and combinations thereof.

15. The coated substrate of claim 12 wherein the adhesion layer has a thickness from about 0.5 to about 5 nanometers, the precious metal layer has a thickness from about 0.5 to about 5 nanometers.

16. The coated substrate of claim 12 wherein the intermediate layer has a thickness from about 0.5 to 10 nanometers.

17. The coated substrate of claim 12 wherein the lattice interrupting layer is $Al_2O_3$ or Al.

18. The coated substrate of claim 12 wherein the lattice interrupting layer is $Al_2O_3$.

* * * * *